United States Patent
Pandit et al.

(10) Patent No.: US 11,657,558 B2
(45) Date of Patent: May 23, 2023

(54) CONTEXT-BASED PERSONALIZED COMMUNICATION PRESENTATION

(71) Applicant: INTERNATIONAL BUSINESS MACHINES CORPORATION, Armonk, NY (US)

(72) Inventors: Sushain Pandit, Austin, TX (US); Shikhar Kwatra, San Jose, CA (US); Lan Ngoc Hoang, Lymm (GB); Geeth Ranmal De Mel, Warrington (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/476,887

(22) Filed: Sep. 16, 2021

(65) Prior Publication Data
US 2023/0082635 A1    Mar. 16, 2023

(51) Int. Cl.
| | | |
|---|---|---|
| *G06T 13/80* | (2011.01) | |
| *G06N 3/04* | (2023.01) | |
| *G10L 25/63* | (2013.01) | |
| *G06F 3/0482* | (2013.01) | |
| *G06F 40/40* | (2020.01) | |

(Continued)

(52) U.S. Cl.
CPC .......... *G06T 13/80* (2013.01); *G06F 3/0482* (2013.01); *G06F 40/40* (2020.01); *G06N 3/0454* (2013.01); *G06V 20/40* (2022.01); *G10L 25/63* (2013.01); *H04L 51/216* (2022.05)

(58) Field of Classification Search
CPC ..... G06F 3/0482; G06F 40/40; G06N 3/0454; G06T 13/80; G06V 20/40; G10L 25/63; H04L 51/16
See application file for complete search history.

(56) References Cited

U.S. PATENT DOCUMENTS 8,421,823 B2 * 4/2013 Nishikawa ....... H04N 21/44008
345/629
9,665,567 B2    5/2017 Liu
(Continued)

FOREIGN PATENT DOCUMENTS

| | | |
|---|---|---|
| CN | 108460812 A | 8/2018 |
| DE | 102017121059 A1 | 3/2018 |
| WO | 2018128996 W | 7/2018 |

OTHER PUBLICATIONS

Arif et al., "3D-CNN-Based Fused Feature Maps with LSTM Applied to Action Recognition", MDPI, Future Internet, Published: Feb. 13, 2019, 17 pages.

(Continued)

*Primary Examiner* — Seth A Silverman
(74) *Attorney, Agent, or Firm* — Eric W. Chesley

(57) ABSTRACT

A method, system, and computer program product for generating context-based tailored emoticons within a communication scenario are provided. The method receives detects an emotion of a user within a communication stream. A set of candidate emojis are generated. A set of emoticons are generated from the set of candidate emojis and a representation of the user. The set of emoticons are presented to the user in a user interface on a computing device associated with the user. The method incorporates a selected emoticon of the set of emoticons into the communication stream with the selected emoticon being selected by the user from the user interface.

20 Claims, 6 Drawing Sheets

(51) Int. Cl.
G06V 20/40 (2022.01)
H04L 51/216 (2022.01)

(56) References Cited

U.S. PATENT DOCUMENTS

| | | | |
|---|---|---|---|
| 10,025,972 | B2 | 7/2018 | Matas |
| 10,593,087 | B2 | 3/2020 | Woo |
| 2015/0100537 | A1 | 4/2015 | Grieves |
| 2015/0332088 | A1* | 11/2015 | Chembula ............ G06V 10/422 382/203 |
| 2017/0052946 | A1* | 2/2017 | Gu ........................ H04L 51/046 |
| 2017/0185581 | A1 | 6/2017 | Bojja |
| 2017/0344224 | A1 | 11/2017 | Kay |
| 2018/0047195 | A1 | 2/2018 | Vissicaro |
| 2018/0061407 | A1* | 3/2018 | Qin ..................... G06F 3/04817 |
| 2018/0314409 | A1 | 11/2018 | Adilipour |
| 2018/0373683 | A1 | 12/2018 | Hullette |
| 2019/0087466 | A1 | 3/2019 | Wang |
| 2019/0199663 | A1* | 6/2019 | Liu ........................ H04L 51/046 |
| 2020/0086496 | A1* | 3/2020 | Shin ..................... B25J 11/0005 |
| 2021/0158594 | A1* | 5/2021 | Huang .................. H04N 5/2621 |
| 2021/0192800 | A1* | 6/2021 | Dutta ..................... G06T 11/00 |

OTHER PUBLICATIONS

Rosenthal, "Why Emojis and Stickers are Big Business", Aug. 19, 2016, 3 pages, https://www.forbes.com/sites/vivianrosenthal/2016/08/19/why-emojis-and-stickers-are-big-business/#51dfacee4965.
Sloat, "Researchers Find That Emojis Are Interpreted Differently Depending on Platform", INVERSE, Apr. 11, 2016, 3 pages.
Mell et al., "The NIST Definition of Cloud Computing", Recommendations of the National Institute of Standards and Technology, NIST Special Publication 800-145, Sep. 2011, 7 pages.

* cited by examiner

CONTEXT-BASED PERSONALIZED COMMUNICATION PRESENTATION

BACKGROUND

Use of virtual chats and communications platforms have expanded since their initial development. Emojis and emoticons have been adopted across many communications platforms and types of communications. Additionally, emojis and emoticons are increasingly being adopted in various communication settings and contexts. Emoji and emoticon libraries may include many options for different concepts, emotions, and visual representations.

SUMMARY

According to an embodiment described herein, a computer-implemented method for generating context-based tailored emoticons within a communication scenario is provided. The method receives detects an emotion of a user within a communication stream. A set of candidate emojis are generated. A set of emoticons are generated from the set of candidate emojis and a representation of the user. The set of emoticons are presented to the user in a user interface on a computing device associated with the user. The method incorporates a selected emoticon of the set of emoticons into the communication stream with the selected emoticon being selected by the user from the user interface.

According to an embodiment described herein, a system for generating context-based tailored emoticons within a communication scenario is provided. The system includes one or more processors and a computer-readable storage medium, coupled to the one or more processors, storing program instructions that, when executed by the one or more processors, cause the one or more processors to perform operations. The operations receive detects an emotion of a user within a communication stream. A set of candidate emojis are generated. A set of emoticons are generated from the set of candidate emojis and a representation of the user. The set of emoticons are presented to the user in a user interface on a computing device associated with the user. The operations incorporate a selected emoticon of the set of emoticons into the communication stream with the selected emoticon being selected by the user from the user interface.

According to an embodiment described herein, a computer program product for generating context-based tailored emoticons within a communication scenario is provided. The computer program product includes a computer-readable storage medium having program instructions embodied therewith, the program instructions being executable by one or more processors to cause the one or more processors to receive detects an emotion of a user within a communication stream. A set of candidate emojis are generated. A set of emoticons are generated from the set of candidate emojis and a representation of the user. The set of emoticons are presented to the user in a user interface on a computing device associated with the user. The computer program product incorporates a selected emoticon of the set of emoticons into the communication stream with the selected emoticon being selected by the user from the user interface.

DETAILED DESCRIPTION

Figure 1:
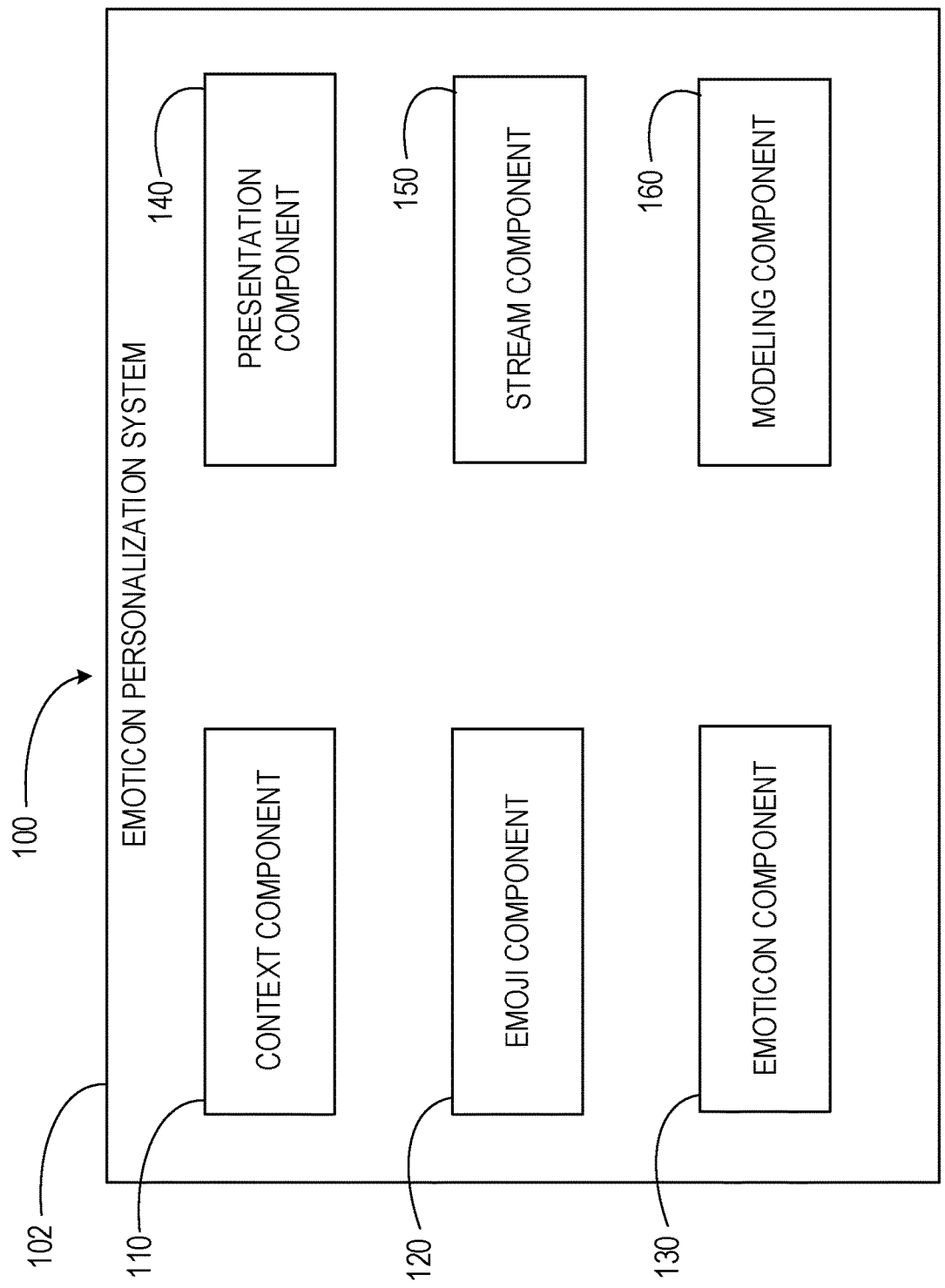
FIG. 1 depicts a block diagram of a computing environment for implementing concepts and computer-based methods, according to at least one embodiment.

The present disclosure relates generally to methods for tailored emoticons. More particularly, but not exclusively, embodiments of the present disclosure relate to a computer-implemented method for generating context-based tailored emoticons within a communication scenario. The present disclosure relates further to a related system for tailored emoticons, and a computer program product for operating such a system.

Use of virtual chats and communications platforms have expanded since their initial development. Live virtual communications are used across different communication settings and contexts, such as informal chats, personal communications, and business and governmental meetings. Virtual chats and communications platforms may incorporate visual, audio, and text communications into a single communication stream. For example, a video chat may include a comment or question section which allows users to communicate simultaneously with images, video, audio, and text.

Emojis and emoticons have been adopted across many communications platforms and types of communications. Additionally, emojis and emoticons are increasingly being adopted in various communication settings and contexts. Recent data indicate that emojis, emoticons, and stickers may be sent at a rate at or exceeding six billion per day. The use of emojis, emoticons, and stickers adds additional visual elements to existing communication types, platforms, and streams.

Emoji and emoticon libraries may include many options for different concepts, emotions, and visual representations. When users engage in communication with emojis, emoticons, stickers, and gifs, the number of available options may present difficulties in locating suitable visual, emotional, or contextual elements in a real time or near-real time communication format. Current systems and methods for presenting emoji, emoticons, stickers, and other visual elements generally present these visual elements based on search terms, historical personal use, historical global use, or default categorization. Such presentation methods limit a user's ability to select desired visual elements in a timely and satisfactory manner for real time or near-real time communications. Given the limitations of current presentation methods, it would be beneficial to have a mechanism to generate and present tailored emoticons within a communication scenario. Further, it would be beneficial to have a mechanism to generate custom context-based tailored emoticons relevant to a subject and emotional context of a communication scenario. It would also be beneficial to have a mechanism to model and generate emoticons by predicting user responses pertaining to altering context and interaction within differing user cohorts and communication scenarios.

Embodiments of the present disclosure generate and present tailored emoticons within a communication scenario or communication stream. In some embodiments, aspects of the present disclosure generate tailored sets of emoticons based on an emotional context of a given communication scenario. Some embodiments of the present disclosure enable tailoring of sets of emoticons based on a given user's history of emoji or emoticon selection. Embodiments of the present disclosure use generative adversarial networks to generate and present sets of emoticons consistent with a user's selection history, mode of communication, and feedback analysis. Some embodiments of the present disclosure insert personalized emoticons based on a generative model that internally uses a long short-term memory (LSTM) module for language analysis in combination with a convolutional neural network (CNN) module for visual recognition. Some embodiments of the present disclosure provide knowledge graph enabled personalized emoticon creation using three-dimensional CNN-LSTM frameworks. Embodiments of the present disclosure provide a unified system and mechanism to insert personalized emoticons based on a generative model, that internally uses an LSTM module for language analysis in combination with a CNN module for visual recognition to provide personalized emojification.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an emoticon personalization system 102. The emoticon personalization system 102 may comprise a context component 110, an emoji component 120, an emoticon component 130, a presentation component 140, a stream component 150, and a modeling component 160. The context component 110 detects emotional context of a user within a communication stream. The emoji component 120 generates sets of candidate emojis for emotional contexts detected within communication streams. The emoticon component 130 generates tailored emoticons based in part on sets of candidate emojis and a representation of a user. The presentation component 140 presents the set of emoticons to the user in a user interface on a computing device associated with the user. The stream component 150 incorporates a selected emoticon of the set of emoticons into the communication stream. The modeling component 160 generates emotional representation models for tailored emoticons and refines context-based tailored emoticons based on the emotional representation models. Although described with distinct components, it should be understood that, in at least some embodiments, components may be combined or divided, and/or additional components may be added without departing from the scope of the present disclosure.

Figure 2:
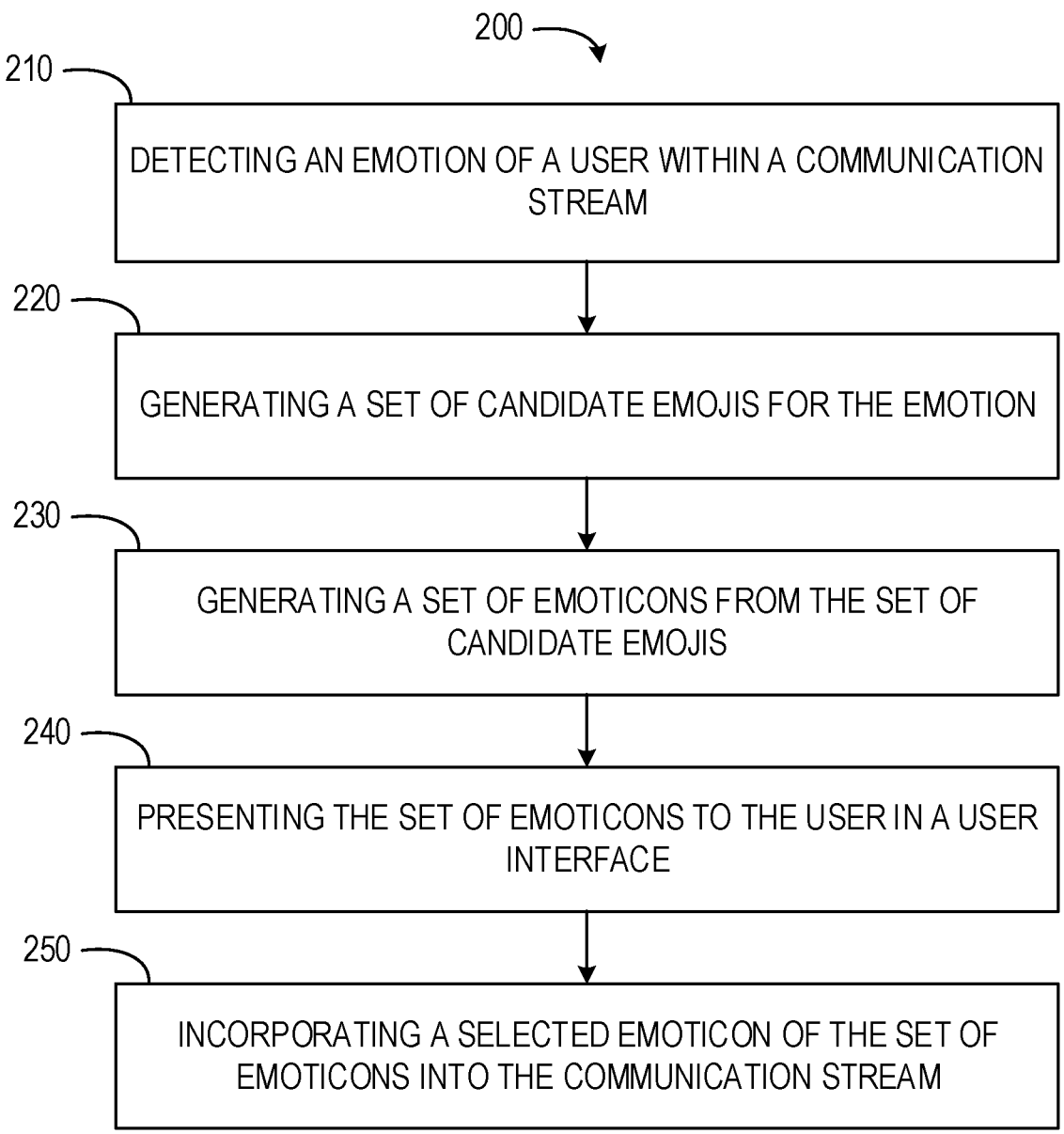
FIG. 2 depicts a flow diagram of a computer-implemented method for generating context-based tailored emoticons within a communication scenario, according to at least one embodiment.

Referring now to FIG. 2, a flow diagram of a computer-implemented method 200 is shown. The computer-implemented method 200 is a method for generating context-based tailored emoticons within a communication scenario. In some embodiments, the computer-implemented method 200 may be performed by one or more components of the computing environment 100, as described in more detail below.

At operation 210, the context component 110 detects an emotion of a user within a communication stream. The emotion of the user may be detected as an emotional context of the user. For example, the emotion or emotional context of the user may be identified as happy, angry, sad, friendly, heated, or any other suitable emotional representation. Further the context component 110 may detect a user context. The user context may differentiate between actions of the user. For example, the context component 110 may differentiate the user context between the user looking at something as compared to the user looking for something.

The context component 110 may detect the emotion of the user using image recognition, natural language processing, machine learning models, or any other suitable mechanism. In some embodiments, the context component 110 uses LSTM and CNN modules for image recognition within a video stream to identify visual indicators of an emotional context of a user within the communication stream. The context component 110 uses LSTM and NLP for text analysis and audio analysis to identify text-based or audio-based indicators of an emotional context of the user within the communication stream. The context component 110 may combine the visual indicators, the text-based indicators, and the audio-based indicators to determine the emotional context or the emotion of the user at a given point in time during the communication stream. For example, a user may be in a virtual chat with a group of friends. The context component 110 may use an NLP module to analyze text and the CNN module to analyze images within the communication stream to identify a probable emotion or emotional context of the user during the video chat.

At operation 220, the emoji component 120 generates a set of candidate emojis for the emotion. The set of candidate emojis may be selected from an emoji library. The set of candidate emojis may be stock or default emojis provided by a third-party application or multiple third-party applications for selection and inclusion in communications between users. Emojis in the emoji library may be associated with metadata describing each emoji, a context of each emoji, associated keywords for the emoji, and any other suitable information. In some instances, the emoji component 120 generates the set of candidate emojis by selecting emojis, from the emoji library, which are associated with metadata representing the emotion.

In some embodiments, the set of candidate emojis are generated based on the emotion of the user. Where the emotion of the user is represented or approximated based on a set of features of the communication stream, the set of candidate emojis may be generated based on the set of features of the communication stream. For example, the set of candidate emojis may be generated based on one or more of a set of image features, a set of text features, and a set of audio features determined from or detected within the communication stream. The emoji component 120 may use extracted features to generate candidate emojis for the sentiment or emotion in the context. In some instances, the emoji component 120 uses a trained CNN model with emoji knowledge and contextual feature knowledge. The emoji knowledge may be gained through training using emoji libraries or databases. The contextual feature knowledge may be gained through training using knowledge or examples about a user mode, user actions, or user attributes captured through video and NLP analysis.

The emoji component 120 may use keywords selected from a text or audio of the communication stream that represent the user's emotion or emotional context for generation of the candidate emojis. The emoji component 120 may compare at least a portion of the keywords to keywords within metadata for emojis within the emoji library. The emoji component 120 may select emojis for inclusion in the set of candidate emojis which have metadata keywords matching, related to, or relevant to the keywords representing the emotion.

At operation 230, the emoticon component 130 generates a set of emoticons. In some embodiments, the set of emoticons are generated from the set of candidate emojis. In some instances, the set of emoticons are generated from a representation of the user. In some embodiments, the set of emoticons are generated from the set of candidate emojis and a representation of the user.

In the example of the user chatting with friends in a virtual chat, the emoji component 120 identifies annotating emojis, stickers, gifs, or other visual media relevant to the emotional context of the user at differing points in time during the virtual chat. The emoticon component 130 generates the set of emoticons as a subset of the emojis, stickers, gifs, or other visual media which are most relevant to the emotional context of the user and relevant to past observed patterns of the user's favorite or previously used icons related to the current emotional context. The emoticon component 130 may also generate the set of emoticons in a manner relevant to a visual depiction of the user, such that the emoticons mimic or match one or more visual characteristics of the user or an avatar of the user. By way of further example, a user talking in front of a camera while playing a computer game may not wish to reveal their real identity or identifying visual representations. In such examples, the emoji component 120 and the emoticon component 130 cooperate to use visual recognition and NLP modules to produce a virtual emojification of the user. Information from the context component 110 may analyze facial gestures, body language, and words or text being used to provide emojification (e.g., static emojis or emoticons and dynamic or moving emojis or emoticons) which represent the emotional context of the user.

In some instances, the context component 110, the emoji component 120, and the emoticon component 130 form a prediction component of the emoticon personalization system 102. In such instances, the prediction component may construct a CNN module with convolutional blocks and maxpooling as an encoding network. An LSTM layer may be added to the CNN module. A Defense layer may be added to the CNN module, such as a defensive quantization layer. A softmax layer may be added to the CNN module. When the prediction component is tasked with predicting and generating the set of emoticons, the prediction component receives a sequence of motion graphs and associating features of emotion status as input. The prediction component also receives location information. The location information may be forward in time for prediction and backward in time for source attribution to identify the emotion and suggested emoji or emoticons. A ConvNet of the prediction component may compress the input sequence to a hidden state tensor. The hidden state tensor may preserve the graph information for the motion graphs. The LSTM may forecast the emotion state to give outputs of one or more new graphs of emotion states. Forecasting may be done by the ConvNet-LSTM knowledge graph. The ConvNet-LSTM model may be trained to minimize cross-entropy loss, with early stopping.

At operation 240, the presentation component 140 presents the set of emoticons to the user in a user interface on a computing device associated with the user. The presentation component 140 may present the set of emoticons within a text window associated with input of text for a text portion of the communication stream. The presentation component 140 may present the set of emoticons within a user interface window for a video portion of the communication stream. The presentation component 140 may present the set of emoticons in a pop-up or external user interface to enable full use and view of a user interface associated with the communication stream.

At operation 250, the stream component 150 incorporates a selected emoticon of the set of emoticons into the communication stream. In some embodiments, the selected emoticon is selected by the user from the user interface. The stream component 150 may incorporate the selected emoticon in a text portion of the communication stream. For example, the stream component 150 may exchange a portion of typed text with the selected emoticon. The stream component 150 may also add the selected emoticon at an end of a text selection typed by the user. In some instances, the stream component 150 incorporates the selected emoticon in a video portion of the communication stream. For example, the stream component 150 may insert the selected emoticon into a portion of a field of view of the video portion of the communication stream. In such examples, the selected emoticon may be placed at a location within the field of view to emphasize an emotional context or emotion of the user (e.g., placing a sweat emoticon to cover a portion of the user's face or placing a heart emoticon floating above the user's head). In some instances, the stream component 150 covers at least a portion of the user's face with the selected emoticon. For example, where the user chooses to maintain privacy and present a series of emoticons or an avatar in the communication stream, the stream component 150 may dynamically change a depiction of the avatar or a previously selected emoticon to the selected emoticon to maintain an emotional or contextual relevance of the depiction of the user based on a current context of the communication stream. The user may indicate placement of the selected emoticon or the stream component 150 may dynamically choose a location and place the selected emoticon based on the emotion, context, historical placement, and user preferences within the communication stream.

Figure 3:
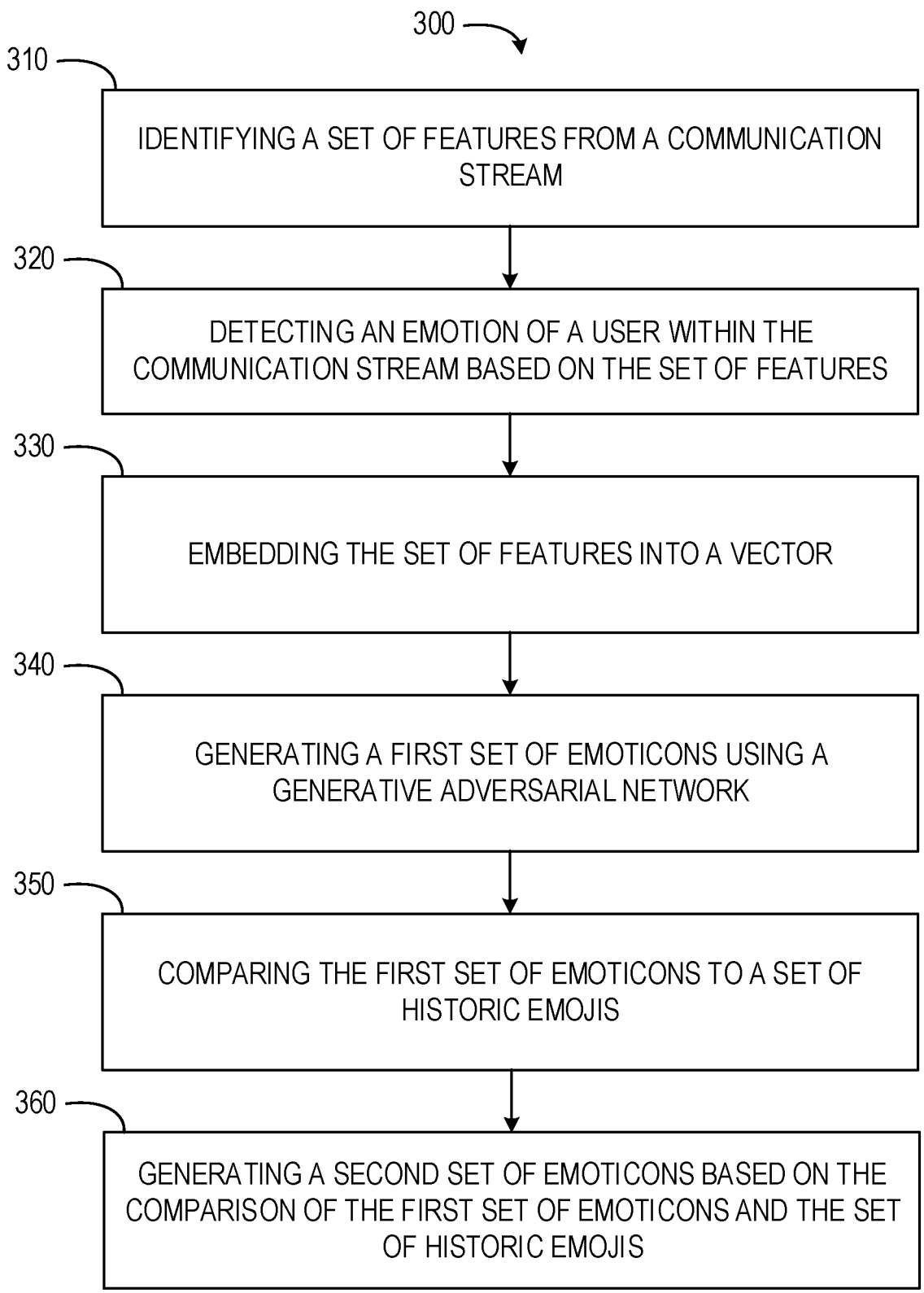
FIG. 3 depicts a flow diagram of a computer-implemented method for generating context-based tailored emoticons within a communication scenario, according to at least one embodiment.

FIG. 3 shows a flow diagram of an embodiment of a computer-implemented method 300 for generating context-based tailored emoticons within a communication scenario. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the context component 110 identifies a set of features from a communication stream. The set of features may be extracted from video portions, text portions, and audio portions of the communication stream. In some embodiments, the context component 110 uses a convolutional neural network with multiple convolutional blocks. The multiple convolutional blocks may be trained to encode emotion classification from input features with labels being emojis. The features may be keywords, entities, key entities, relationships, sentiments from current sentences, correlations between current features and previous features occurring in a previous portion of the communication. The features may describe, define, or represent subjects, emotions, relationships, or concepts being discussed in the communication stream.

In some embodiments, the context component 110 identifies a set of image features from the communication stream. The context component 110 may identify the set of image features by performing image recognition on a visible portion of a user in a video portion of the communication stream.

In some embodiments, the context component 110 identifies a set of text features from the communication stream. The context component 110 may identify the set of text features by performing natural language processing on a text portion of the communication stream. In some embodiments, the context component 110 identifies a set of audio features from the communication stream. Text and audio features may be collected from the communication stream using LSTMs, transformers, and CNNs. In some instances, a transformer-based neural architecture may be used to identify the set of text and audio features.

In operation 320, the context component 110 detects the emotion of a user within the communication stream based on the set of features. In some embodiments, the emotion of the user is detected based on the image features, the text features, and the audio features. The context component 110 may detect the emotion or emotional context of the user by matching keywords representing the image features, text features, and audio features with emotion keywords, relationship keywords, subject matter keywords, combinations thereof, or any other suitable representations of emotions.

The context component 110 may detect the emotion of the user based on identification of the set of image features for the user based on image recognition performed on a video portion of the communication stream. In such instances, the image features represent at least a portion of an emotional context for the user. The context component 110 may use LSTM-CNN models to perform image recognition of user attributes representing or associated with emotional contexts or an emotional state of the user.

In some embodiments, the context component 110 uses LSTM-CNN models to generate a motion map of the user within a field of view of an image capture device (e.g., a camera, a video camera, a web cam). Two-dimensional or three-dimensional convolutional neural networks connect individual frames within a video portion of the communication stream and spatial or temporal dimensions of attributes of the user to generate the motion map. The motion map may then be labeled and used to recognize body language and gesture cues for emotion analysis. Dominant and dynamic features are captured across the frames and a contextual label is extracted for the dominant and dynamic features to represent a current emotion of the user.

The context component 110 may detect the emotion of the user based on identification of the set of text features for the text portion of the communication stream. In some instances, the context component 110 may perform natural language processing on the text portion of the communication stream and a text history of the user. In such instances, the context component 110 identifies the set of text features based on the text portion of the communication stream and the text history of the user. The text features may represent at least a portion of an emotional context of the user.

In some embodiments, the context component 110 uses motion mapping with an interactive pattern history. The motion mapping may combine input from video frames, audio portions, and text portions of the communication stream and use three-dimensional LSTM-CNN and LSTM models to determine emotional context for the user. The interactive pattern history may combine historical motion maps generated for the user with a current motion map generated from the communication stream.

In operation 330, the modeling component 160 embeds the set of features into a vector. The vector may be a feature vector configured for use in a GAN. In some embodiments, the set of features includes the set of image features, the set of text features, and the set of audio features. The embedded features may be identified or generated by CNN and LSTM analysis on the communication stream. In some instances, the set of features are embedded into a vector to generate one or more of the set of candidate emojis and the set of emoticons.

In operation 340, the emoticon component 130 generates a first set of emoticons using a generative adversarial network (GAN). In some embodiments, the emoticon component 130 and the GAN generates the set of emoticons using the vector and a set of candidate emojis.

In operation 350, the modeling component 160 compares the first set of emoticons to a set of historic emojis. The set of historic emojis representing emojis previously selected by the user. In some instances, the modeling component 160 uses a discriminator module in the GAN to learn how to discriminate the first set of emoticons from an emoji dataset. The modeling component 160 may perform recursive training based on responses, feedback, and selection of emoticons from the first set of emoticons. In some instances, the modeling component 160 performs verification and updating of the first set of emoticons based on incoming data.

In some embodiments, the modeling component 160 performs loss evaluation and adjustment of gradients for a generator (e.g., a module responsible for generating emoticons) and the discriminator within the GAN. The loss evaluation may compare the first set of emoticons to the historic emojis to provide information about the relevance of at least a portion of the first set of emoticons. The gradients of the generator and discriminator may be adjusted until they reach a steady state. For example, an LSTM layer of the GAN may act to predict how the emotion classification and suggested emojis change across time by performing loss evaluation and adjusting gradients of the generator and the discriminator.

In some embodiments, loss may be understood as cross-entropy between a forecast and emotion label. The output (e.g., the first set of emoticons) may be compared with historic or proxy datasets of emoji usage and emotion status to train future iterations and generate subsequent emoticons. A common ratio between training and testing datasets may be maintained at 80:20, may vary based on available data, or use any other suitable ratio.

In operation 360, the emoticon component 130 generates a second set of emoticons. The second set of emoticons may be a set of presentation emoticons, generated for presentation to the user and use within the communication stream. In some embodiments, the second set of emoticons is generated based on the comparison of the first set of emoticons and the set of historic emojis. As discussed above with respect to adjusting gradients, once a steady state is achieved, the output of the generator module with respect to the discriminator to obtain a candidate or a set of candidate emoticons. The candidate or set of candidate emoticons may be a reflection of the user's current mode or emotion context.

Figure 4:
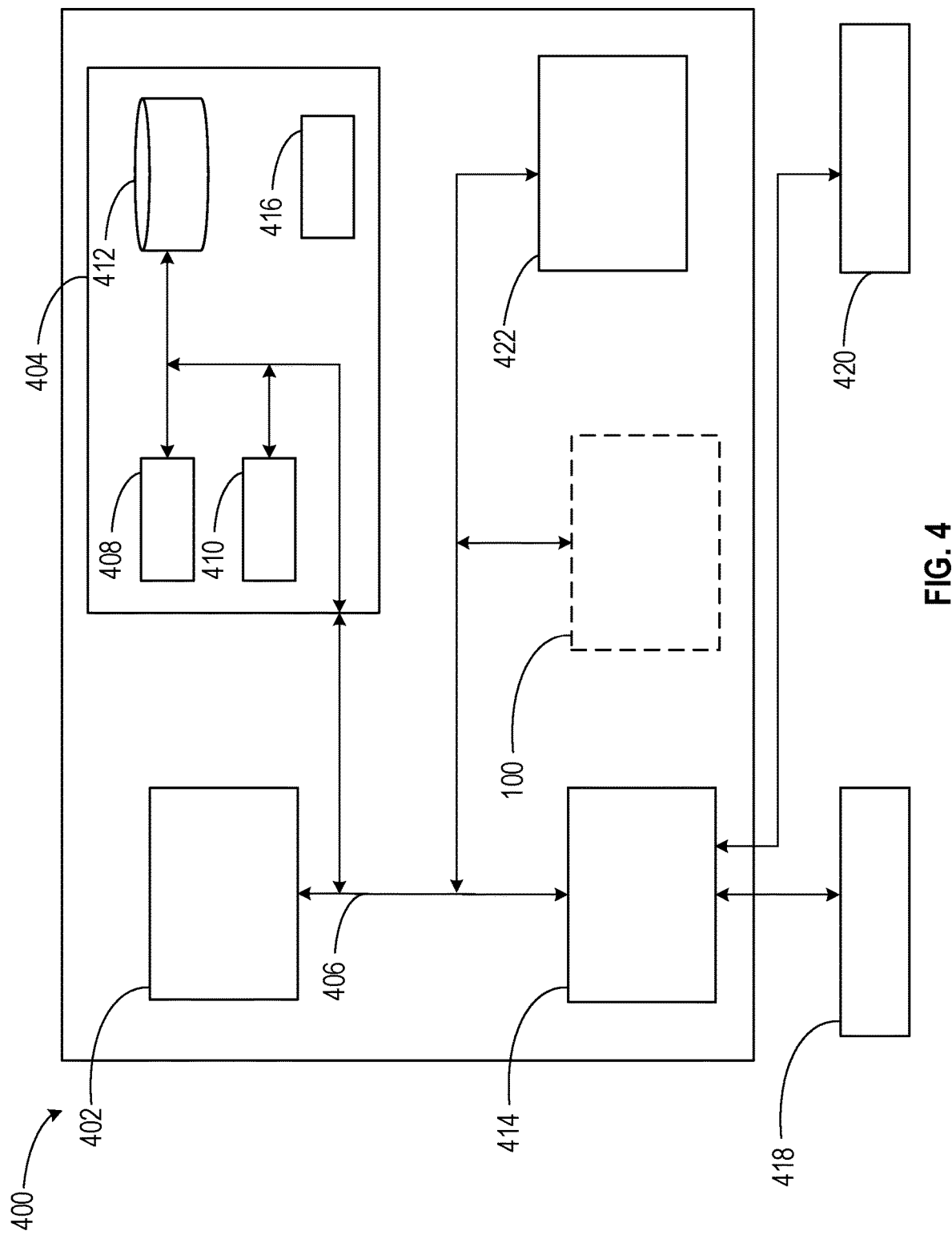
FIG. 4 depicts a block diagram of a computing system for generating context-based tailored emoticons within a communication scenario, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for generating context-based tailored emoticons within a communication scenario.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general-purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the context component 110, the emoji component 120, the emoticon component 130, the presentation component 140, the stream component 150, and the modeling component 160, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
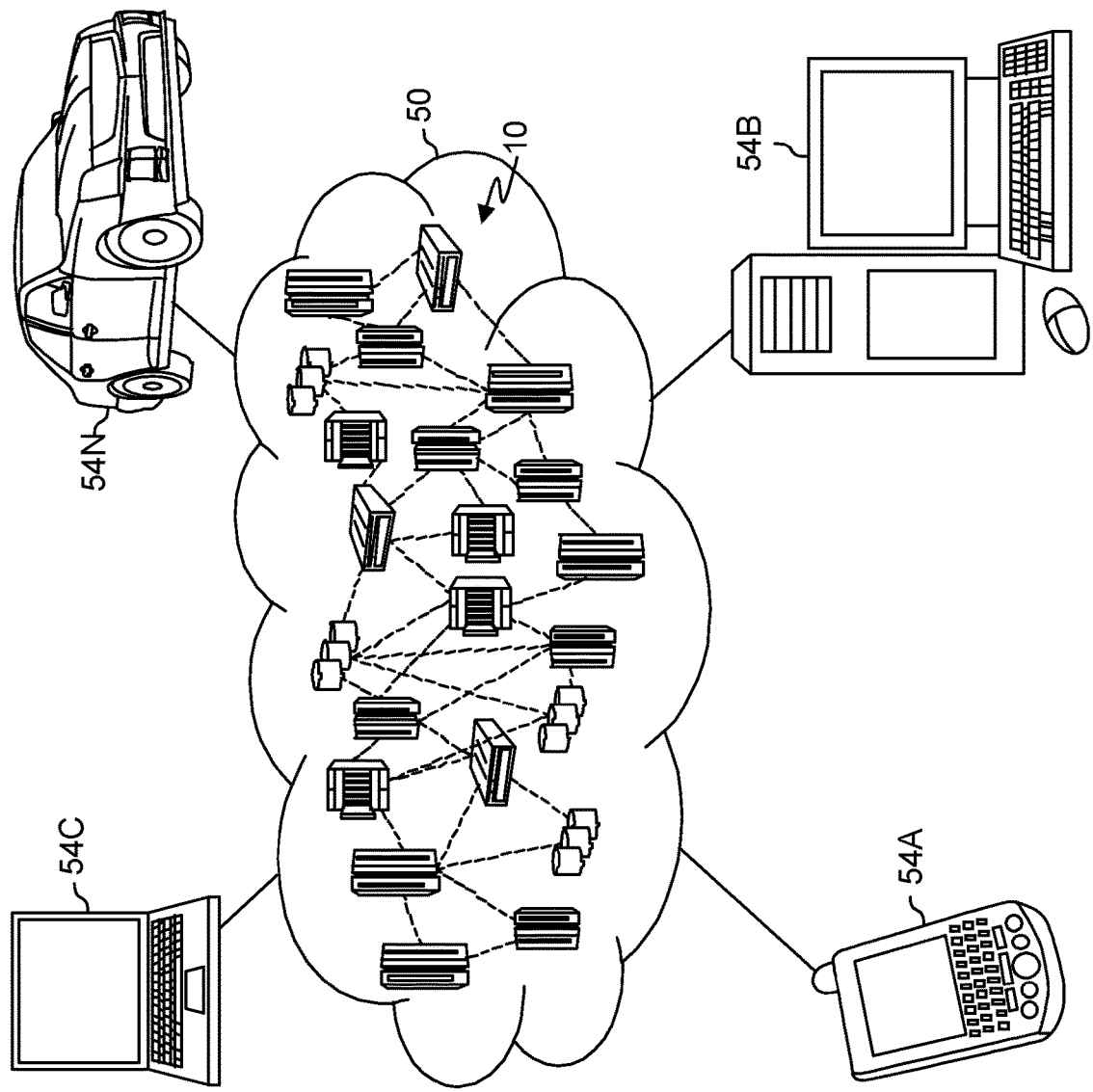
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
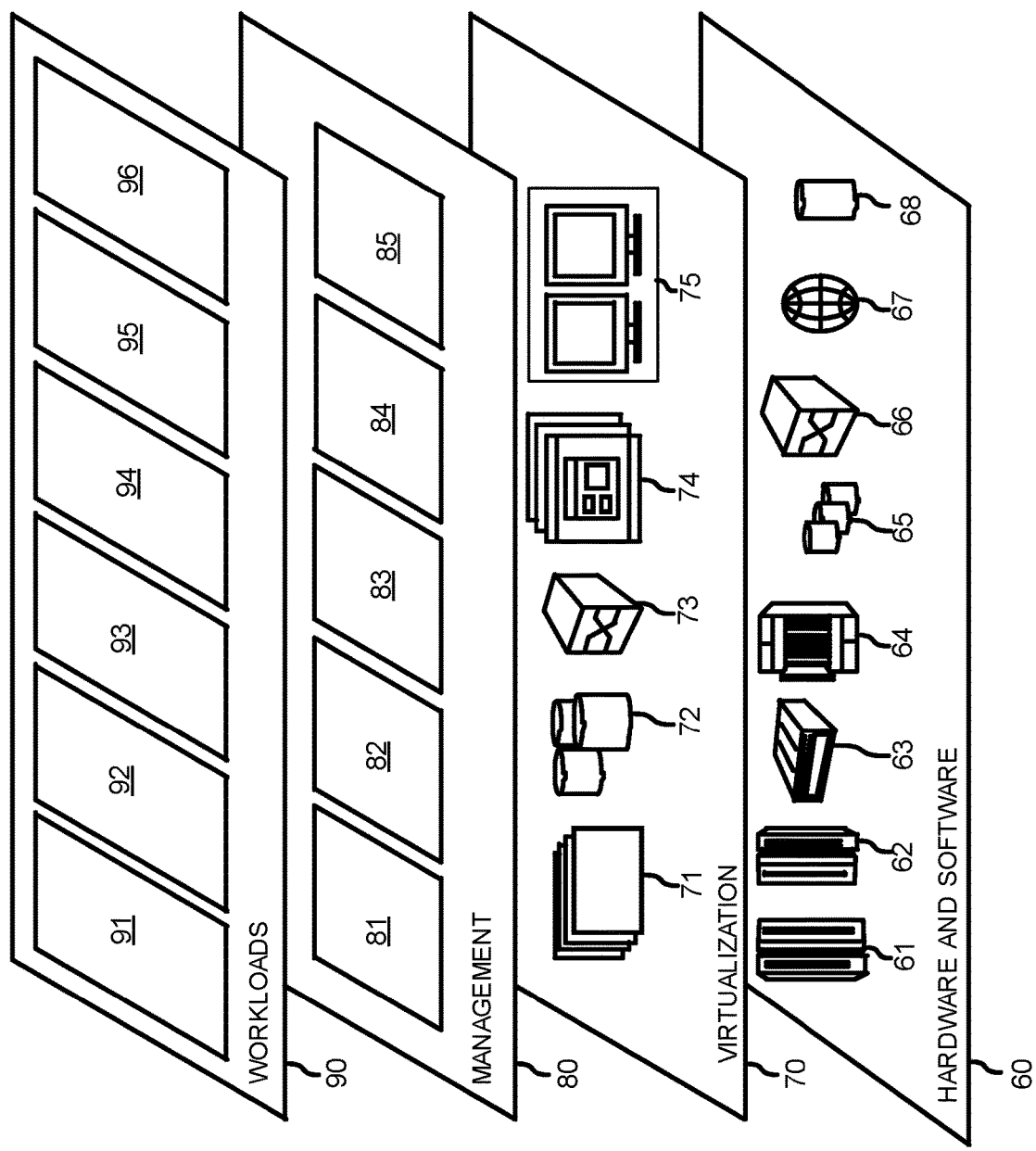
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and emotion representation modeling processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    detecting an emotion of a user within a communication stream;
    generating a set of candidate emojis for the emotion based in part on a set of historic emojis previously selected by the user that correspond to the emotion, wherein the user's past observed patterns of selecting emojis related to the emotion determine the set of historic emojis;
    generating a set of emoticons from the set of candidate emojis and a representation of the user;
    presenting the set of emoticons to the user in a user interface on a computing device associated with the user; and
    incorporating a selected emoticon of the set of emoticons into the communication stream, the selected emoticon selected by the user from the user interface.

2. The method of claim 1, wherein detecting the emotion of the user further comprises:
    identifying a set of image features from the communication stream;
    identifying a set of text features from the communication stream;
    identifying a set of audio features from the communication stream; and
    detecting the emotion of the user within the communication stream based on the set of image features and the set of text features.

3. The method of claim 2, wherein detecting the emotion of the user further comprises:
    performing image recognition of the user in a video portion of the communication stream; and
    identifying the set of image features for the user based on the image recognition, the image features representing at least a portion of an emotional context for the user.

4. The method of claim 2, wherein detecting the emotion of the user further comprises:
    performing natural language processing on a text portion of the communication stream;
    performing natural language processing on a text history of the user; and
    identifying the set of text features based on the text portion of the communication stream and the text history of the user, the text features representing at least a portion of an emotional context of the user.

5. The method of claim 2, wherein generating the set of candidate emojis further comprises:
    embedding the set of image features, the set of text features, and the set of audio features into a vector.

6. The method of claim 5, wherein the set of emoticons are generated by a generative adversarial network using the vector and the set of candidate emojis.

7. The method of claim 3, wherein detecting the emotion of the user further comprises:
- obtaining an interactive pattern history associated with the user by combining a current motion map generated from the communication stream with historical motion maps associated with the user; and
- determining emotional context of the user, based in part, on the interactive pattern history.

8. A system, comprising:
- one or more processors; and
- a computer-readable storage medium, coupled to the one or more processors, storing program instructions that, when executed by the one or more processors, cause the one or more processors to perform operations comprising:
  - detecting an emotion of a user within a communication stream;
  - generating a set of candidate emojis for the emotion based in part on a set of historic emojis previously selected by the user that correspond to the emotion, wherein the user's past observed patterns of selecting emojis related to the emotion determine the set of historic emojis;
  - generating a set of emoticons from the set of candidate emojis and a representation of the user;
  - presenting the set of emoticons to the user in a user interface on a computing device associated with the user; and
  - incorporating a selected emoticon of the set of emoticons into the communication stream, the selected emoticon selected by the user from the user interface.

9. The system of claim 8, wherein detecting the emotion of the user further comprises:
- identifying a set of image features from the communication stream;
- identifying a set of text features from the communication stream;
- identifying a set of audio features from the communication stream; and
- detecting the emotion of the user within the communication stream based on the set of image features and the set of text features.

10. The system of claim 9, wherein detecting the emotion of the user further comprises:
- performing image recognition of the user in a video portion of the communication stream; and
- identifying the set of image features for the user based on the image recognition, the image features representing at least a portion of an emotional context for the user.

11. The system of claim 9, wherein detecting the emotion of the user further comprises:
- performing natural language processing on a text portion of the communication stream;
- performing natural language processing on a text history of the user; and
- identifying the set of text features based on the text portion of the communication stream and the text history of the user, the text features representing at least a portion of an emotional context of the user.

12. The system of claim 9, wherein generating the set of candidate emojis further comprises:
- embedding the set of image features, the set of text features, and the set of audio features into a vector.

13. The system of claim 12, wherein the set of emoticons are generated by a generative adversarial network using the vector and the set of candidate emojis.

14. The system of claim 10, wherein detecting the emotion of the user further comprises:
- obtaining an interactive pattern history associated with the user by combining a current motion map generated from the communication stream with historical motion maps associated with the user; and
- determining emotional context of the user, based in part, on the interactive pattern history.

15. A computer program product comprising a computer readable storage medium having program instructions embodied therewith, the program instructions being executable by one or more processors to cause the one or more processors to perform operations comprising:
- detecting an emotion of a user within a communication stream;
- generating a set of candidate emojis for the emotion based in part on a set of historic emojis previously selected by the user that correspond to the emotion, wherein the user's past observed patterns of selecting emojis related to the emotion determine the set of historic emojis;
- generating a set of emoticons from the set of candidate emojis and a representation of the user;
- presenting the set of emoticons to the user in a user interface on a computing device associated with the user; and
- incorporating a selected emoticon of the set of emoticons into the communication stream, the selected emoticon selected by the user from the user interface.

16. The computer program product of claim 15, wherein detecting the emotion of the user further comprises:
- identifying a set of image features from the communication stream;
- identifying a set of text features from the communication stream;
- identifying a set of audio features from the communication stream; and
- detecting the emotion of the user within the communication stream based on the set of image features and the set of text features.

17. The computer program product of claim 16, wherein detecting the emotion of the user further comprises:
- performing image recognition of the user in a video portion of the communication stream; and
- identifying the set of image features for the user based on the image recognition, the image features representing at least a portion of an emotional context for the user.

18. The computer program product of claim 16, wherein detecting the emotion of the user further comprises:
- performing natural language processing on a text portion of the communication stream;
- performing natural language processing on a text history of the user; and
- identifying the set of text features based on the text portion of the communication stream and the text history of the user, the text features representing at least a portion of an emotional context of the user.

19. The computer program product of claim 16, wherein generating the set of candidate emojis further comprises:
- embedding the set of image features, the set of text features, and the set of audio features into a vector; and
- generating the set of emoticons by a generative adversarial network using the vector and the set of candidate emojis.

20. The computer program product of claim 17, wherein detecting the emotion of the user further comprises:
- obtaining an interactive pattern history associated with the user by combining a current motion map generated from the communication stream with historical motion maps associated with the user; and determining emotional context of the user, based in part, on the interactive pattern history.

\* \* \* \* \*